June 4, 1946.    R. R. VOUGHT    2,401,530
SHUTTERLESS AERIAL CAMERA
Filed Nov. 16, 1940    4 Sheets-Sheet 1

RUSSELL R. VOUGHT,
INVENTOR:

BY
ATTORNEY

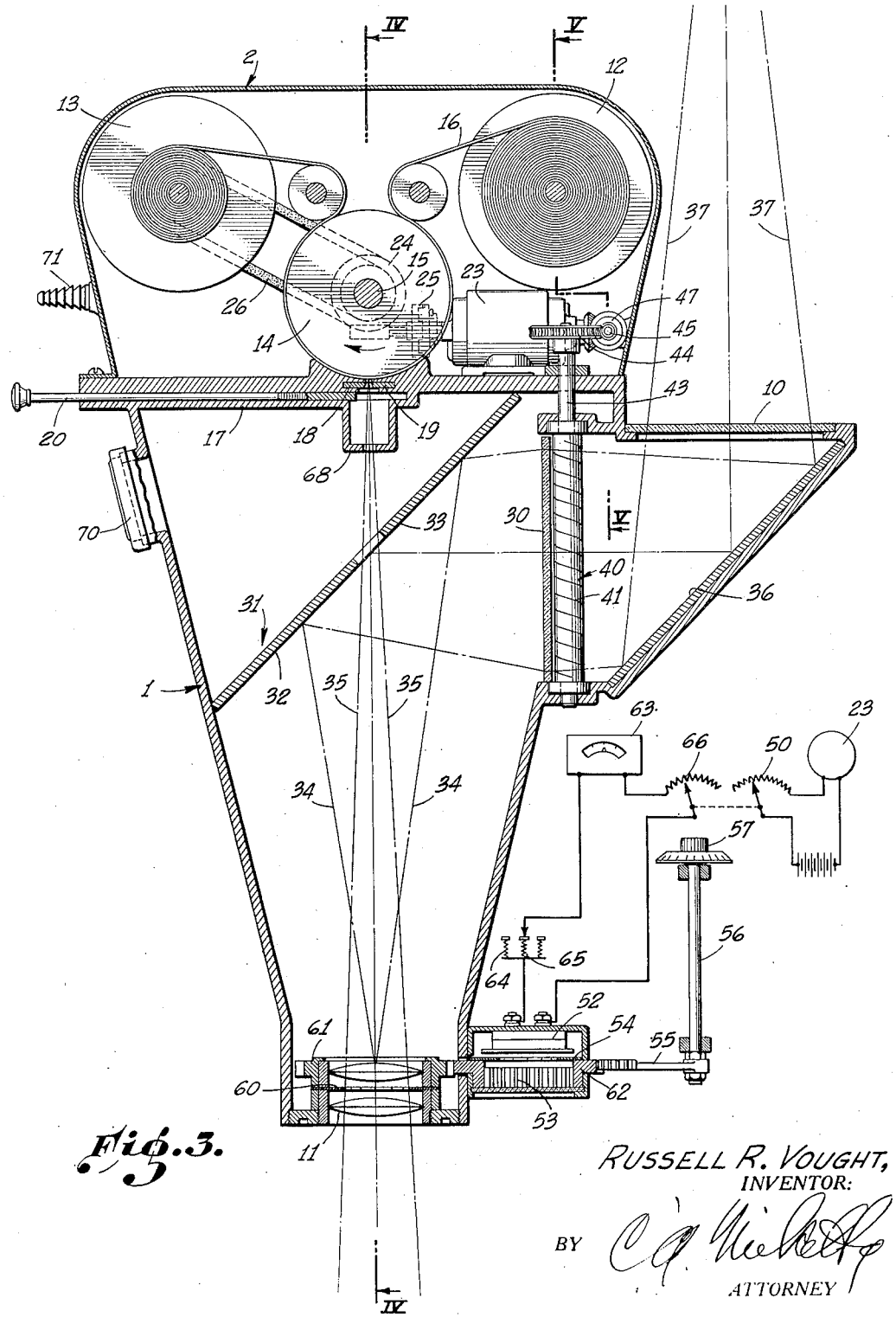

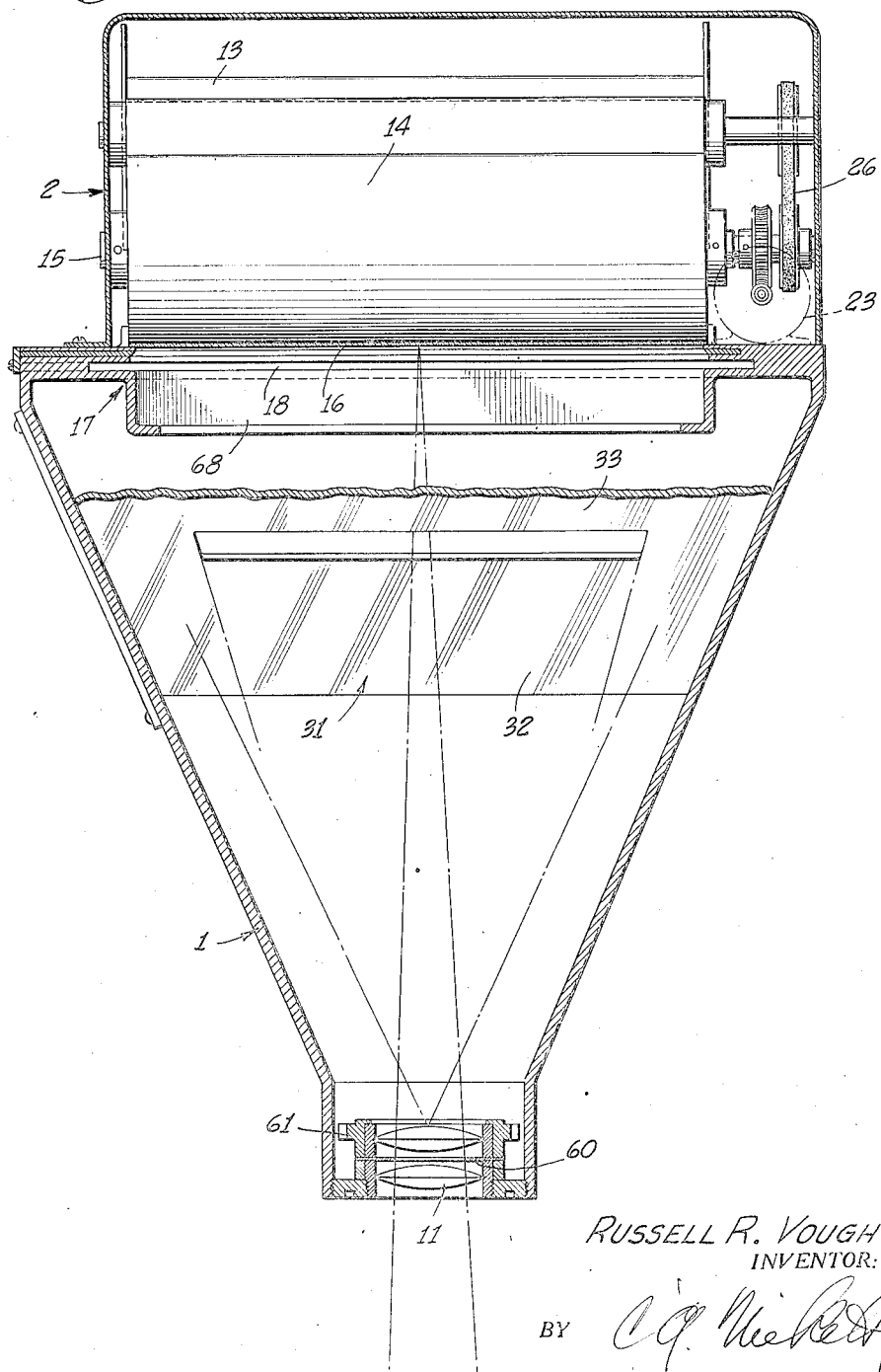

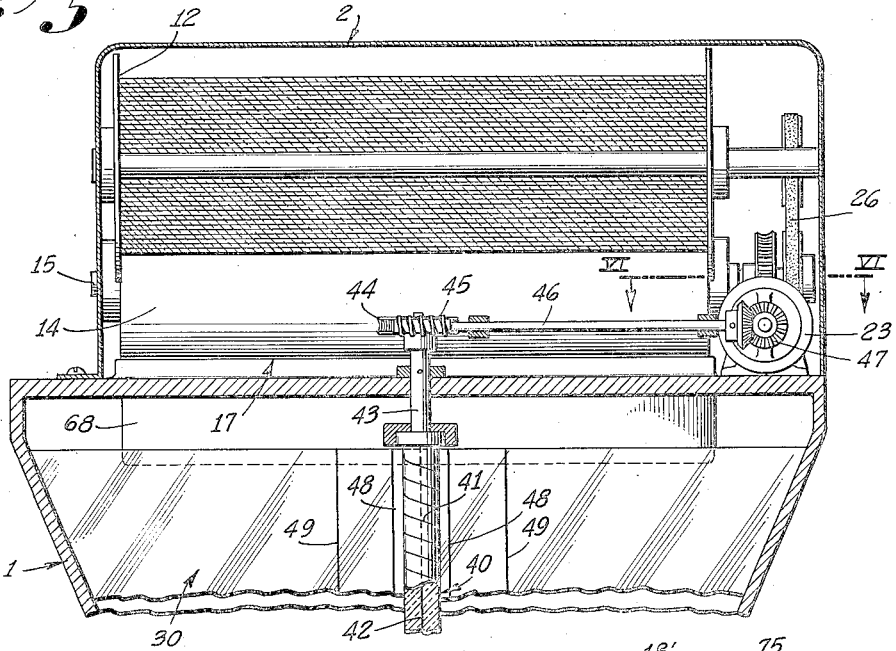
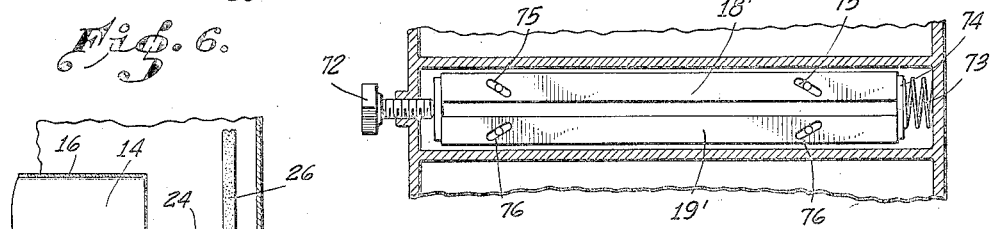
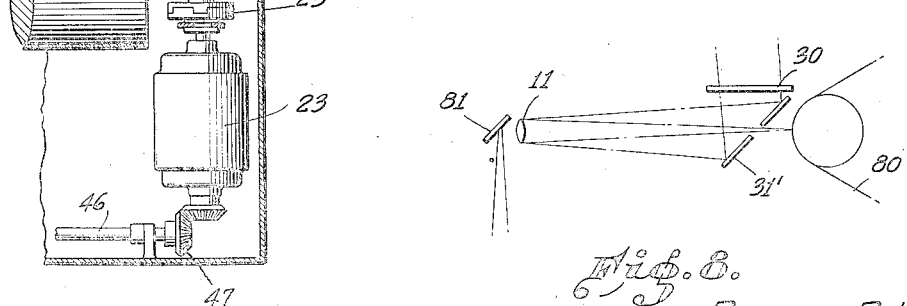

Patented June 4, 1946

2,401,530

UNITED STATES PATENT OFFICE 2,401,530

SHUTTERLESS AERIAL CAMERA

Russell R. Vought, Beverly Hills, Calif.

Application November 16, 1940, Serial No. 365,995

13 Claims. (Cl. 95—12.5)

This invention pertains to improvements in cameras, particularly aerial cameras of the type adapted for use in military and mapping operations.

Aerial cameras of the type in which this invention may be embodied to best advantage are relatively large cameras adapted to be carried aloft for the purpose of photographing the terrain from high altitudes. Heretofore intermittently operated cameras have been employed for this purpose. The time interval between exposures varies with the speed of the plane and the altitude at which it is being flown and a series of pictures being thus obtained depicts overlapping portions of terrain. After being developed and printed, these separate pictures were compared and assembled. This method of operation is wasteful of film and a great amount of time is consumed in properly combining and correlating the various pictures.

The present invention is particularly directed to an aerial camera which is of simple construction and which can be operated very readily and easily without the necessity of making numerous adjustments and calculations in order to compensate for the speed and altitude of the plane, the brightness of the field of view being photographed, type of emulsion employed on the film, etc. Moreover, the present invention is directed toward an aerial camera which, instead of producing a series of separate spaced pictures of a terrain, is capable of producing a single continuous picture of all of the terrain over which a plane may fly during a mapping or observation tour. As a result, it is not necessary to spend a long period of time in properly correlating independent, relatively small pictures but instead the entire terrain covered by a mapping flight is shown in a continuous manner upon a single picture of considerable length.

Generally stated, therefore, the present invention pertains to an aerial camera of the shutterless type, the film being continuously exposed through a relatively narrow aperture slit. Means are provided whereby objects within the field of view of the objective lens of the camera are visible to the operator during photography. Means are also provided whereby the speed with which the film is driven past the aperture slit may be adjusted or varied in accordance with the speed of the object images moving in the focal plane of the camera and in this manner accuracy and sharp photographic images may be obtained under varying conditions of plane speed, even though the altitude is varied. Means are also provided whereby the photographic density is adjusted automatically with changes in altitude or speed and furthermore, means are provided whereby the brightness of the field of view is taken into consideration during photography so that under-exposure or over-exposure can be prevented.

An object of the present invention, therefore, is to disclose and provide an aerial camera having the characteristics and advantages mentioned hereinabove.

Another object is to provide an aerial camera of the continuous shutterless type whereby a continuous picture of terrain over which a plane has flown may be obtained.

A still further object is to provide an aerial camera including an intervalometer traversing a viewing screen, such viewing screen depicting images of objects within the field of view of the objective lens.

An object of the present invention also is to provide an intervalometer of simple and effective construction.

A still further object of the invention is to provide exposure regulating means sensitive to light from within the field of view of the objective lens whereby the operation of the aerial camera is rendered more definite and certain.

These and other objects of the invention will become apparent to those skilled in the art from the following description of an exemplary form of the invention. In order to facilitate understanding, reference will be had to the appended drawings depicting one form of camera in which this invention may be embodied, and in such drawings:

Fig. 3 is an enlarged vertical section.

Fig. 4 is a transverse section taken along the plane IV—IV of Fig. 3.

Fig. 5 is a vertical section of the upper portion of the camera, the section being taken along the plane V—V of Fig. 3.

Fig. 6 is a horizontal section of a portion of the camera, the section being taken along the plane VI—VI indicated in Fig. 5.

Fig. 7 is a horizontal section of a slightly modified form of masking and aperture slit means.

Fig. 8 is a diagrammatic representation of a modified form of camera capable of being employed.

Figure 1:
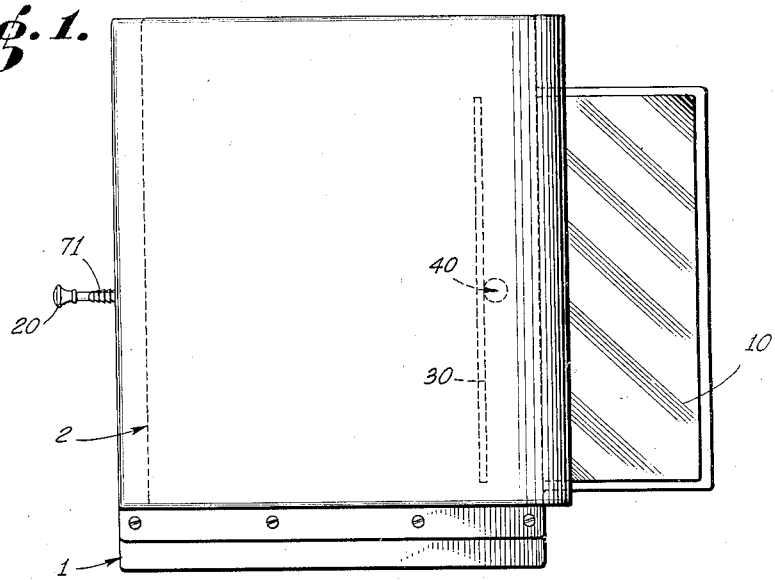
Fig. 1 is a plan view of an aerial camera embodying the present invention.
Figure 2:
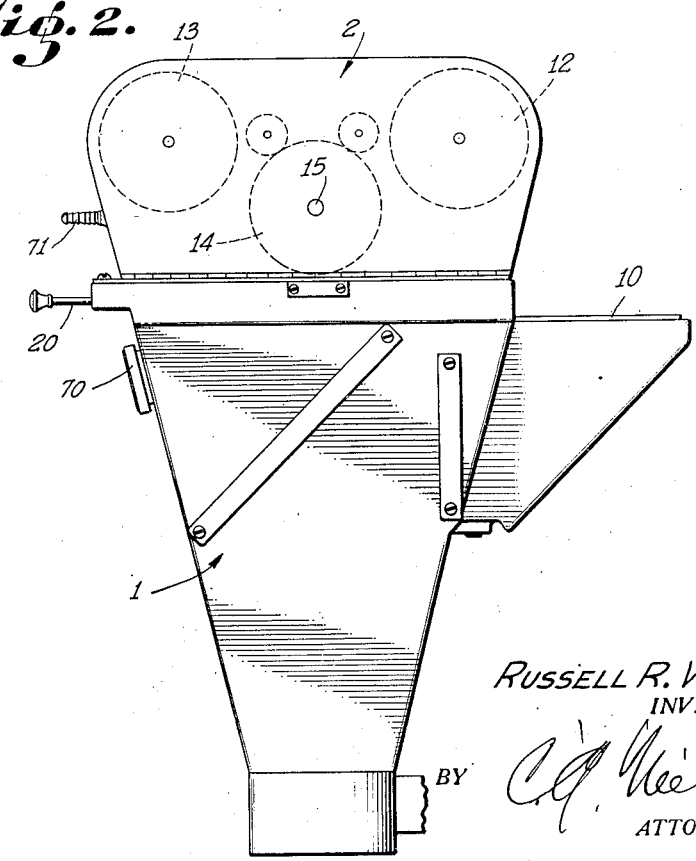
Fig. 2 is a side elevation of the camera shown in Fig. 1.

The aerial camera depicted includes a camera housing, generally indicated at 1, provided with a magazine chamber 2 which may be removable in its entirety or which may be provided with suitable light tight closures by means of which access may be had to the take-up and feed reels therein. The entire camera may be suspended in a suitable gimbal mounting, whereby the camera may be rotated about its optical axis and maintained perpendicular to the ground during flight. Partial rotation of the camera about its optical axis may be necessary to compensate for drift of the airplane on which the camera is carried, it being desirable to have the film move through the camera in the direction of flight of the airplane and not at an angle thereto.

The camera housing 1 also includes an observation plate 10 through which the viewing screen may be seen by the operator.

The exemplary form of the camera is shown in greater detail in Figs. 3 to 6. It will be noted that the camera housing 1 is provided with an objective lens, generally indicated at 11. Within the magazine 2 at the opposite end of the camera there is provided a supply reel 12 and a take-up reel 13 for the photographic film upon which the pictures are to be recorded. The film is moved in the focal plane of the objective lens 11 in any suitable manner, for example, by means of a relatively large drum 14 carried by a shaft 15, this drum being adapted to carry the emulsion of the film 16 through the focal plane of the objective lens 11. A masking member is provided along the focal plane of the objective lens and such masking member may comprise a wall separating the main camera housing 1 from the magazine 2. Such masking member is generally indicated at 17 and preferably includes portions defining a narrow aperture slit. Such portions are indicated at 18 and 19 and are closely adjacent to the surface of the film being carried by the film-advancing roller 14. Preferably the aperture slit has a length substantially equal to the exposure width of the film 16 within the magazine 2. The axis of the aperture slit is also preferably in line with the axis of rotation of the film-moving roller 14 and intersects the optical axis of the objective lens 11. Differently stated, the narrow aperture slit is transverse to the direction of flight of the airplane on which it is carried and the film is moved transversely past the slit. A dark slide provided with the actuating handle 20 may be built into the masking member 17 for the purpose of positively preventing the passage of light from the objective into the magazine or through the aperture slit when the camera is not in use.

Adjustable motor means are provided for driving the film-moving roller 14 so as to move the film 16 transversely past the aperture slit defined by opposing edges of the members 18 and 19. Such motor means may comprise an electric motor 23 operably connected as by means of suitable gearing including worm gear 24, to the shaft 15 of the feed roller 14. A releasable clutch 25 may be interposed between the motor 23 and the shaft 15.

A slip drive connection is made between the motor 23 and the take-up reel. One of the simplest forms of driving connection between the motor 23 and the take-up reel 13 comprises a belt drive 26, the pulley on the shaft of the take-up reel 13 being frictionally attached thereto. When a slip drive connection is made with the take-up reel only, a brake or friction drag is applied to the shaft of the supply reel 12 so as to maintain the film 16 under suitable slight tension during its movement from the supply reel 12 to the take-up reel 13.

The camera of the present invention includes a viewing screen adapted to depict objects within the field of view of the objective lens 11. Such viewing screen is indicated at 30 and may be made of translucent glass or thermoplastic material such as methyl-methacrylate resin or similar material. In the embodiment illustrated, the viewing screen 30 lies in a plane parallel to the optical axis of the objective lens 11 and is substantially as wide as the film 16, although in height such viewing screen is shorter than the total field of view of the objective lens 11. This viewing screen is adapted to receive images from a reflector, generally indicated at 31, positioned within the camera housing 1 and intersecting the optical axis of the objective. This reflector 31 is provided with two reflective portions 32 and 33 respectively, which are spaced one from the other so as to form an opening or slit parallel to the aperture slit.

It is to be understood that the reflective portions 32 and 33 are preferably front surface reflectors and may be entirely separate one from the other so as to leave a free open space therebetween. Lines 34 indicate the path of rays from the objective to the reflector 31 and their further course on the viewing screen 30. Lines 35 depict the path of rays from the objective through the reflector 31 into the aperture slit.

Reflective means are provided whereby the viewing screen 30 and images appearing thereon may be observed by the operator by looking along an optical axis parallel to the optical axis of the objective lens 11. Such means may include the mirror 36 which permits an observer whose eyes are located at the junction of lines 37 to look downwardly in the same direction in which the optical axis of objective 11 extends through the observation window 10 and see the images of objects within the field of view of the objective 11 as such images move over the viewing screen 30. It is evident that the observer will see images of ground objects while they are moving over the viewing screen substantially at the same time that such images are moving through the focal plane of the camera, both before and after their images have been impressed upon the film through the narrow aperture slit. The image of a ground object will be first seen in the upper portion of viewing screen 30 (reflected from 33) so that its rate of movement can be observed before the ground object is photographically recorded through the slit.

An intervalometer is provided adjacent the viewing screen 30 whereby the rapidity with which the object images are moving may be determined and correlated to the speed at which the film is moving past the aperture slit. The intervalometer shown in the drawings comprises a transparent cylinder 40 traversing the viewing screen 30, said cylinder carrying a helix 41 on its surface, this helix being opaque. The cylinder has an axial reference portion such as, for example, a bore filled with opaque substance and indicated at 42 (see Fig. 5). This cylinder 40 preferably extends in a direction transverse to the axis of the aperture slit and is mounted for rotation about its axis. The driving means illustrated comprise the shaft 43, worm 44, worm gear 45, stud shaft 46 and bevel gears 47 connecting such stud shaft 46 with the motor 23.

Radical lines 48, 49 and the like, may be inscribed upon the viewing screen 30 so that the drift of the images may be determined.

By referring to the wiring diagram to the right of Fig. 3 it will be noted that the motor 23 there shown is supplied with current from a battery and variable resistance means 50 are shown for the purpose of controllably regulating the speed of the motor 23. Those skilled in the art will appreciate that an adjustable motor means has been provided for simultaneously driving the intervalometer and the film-moving means 14. It is to be noted, however, that although the intervalometer 40 may be driven whenever the motor 23 is energized, the film-moving means 14 may be cut in or out at will by manipulation of the clutch 25.

Exposure regulating means are provided for the purpose of controlling the exposure of the film or density of the images recorded thereon. Such exposure regulating means may assume various forms, and only one of such forms is shown in the appended drawings. As there depicted, the exposure regulating means may include a photoelectric cell 52 of the photronic type, adapted to receive light from within the field of view of the objective lens 11. A honeycomb 53 may be placed in operative relation to the cell 52 for the purpose of limiting its field of view to substantially the same field as that observed by the lens 11. This photoelectric cell 52 may have an iris diaphragm 54 operably associated therewith, such iris being manually adjustable as by means of a sector gear 55 operable by means of a stud 56 and knob 57. The objective lens 11 may be provided with its iris diaphragm 60 actuated by an operating ring 61, this operating ring 61 being geared to the operating ring 62 of the iris 54. Manual operation of the knob 57 will therefore close both of the irises 54 and 60.

Means are provided for indicating the response of the photoelectric cell 52 and such indicating means are diagrammatically shown at 63. The circuit connecting the cell 52 with the indicating device 63 may include one or more fixed resistors 64 and 65 which may be selectively plugged into the circuit. The circuit may also include a variable resistor 66 which is mechanically coupled to the variable resistor 50 of the motor circuit.

The operation of the camera can now be readily understood. After the plane has reached its desired altitude and is approaching the terrain which is desired to be photographed, the observer adjusts his camera for exposure. It may be noted that different types of emulsion may be carried by the film 16, such different types necessitating variations in exposure. The resistances 64 and 65 are preselected so that each resistance is correlated to the exposure characteristic of a given type of film. Since the operator knows the type of film contained in the magazine 2, he first selects the desired resistance which is plugged into the photoelectric circuit and then manually adjusts the irises 54 and 60 so as to cause the indicating means 63 to reach a null point. The observer then energizes the motor 23 and watches the viewing screen. By adjusting the variable resistance 50, he may cause the intervalometer 40 to keep step with the images of objects moving over the viewing screen 30. After this is accomplished, he may withdraw the dark slide by actuating the knob 20, and engage the clutch 25. From that point on, it will be found that the film 16 will move transversely past the aperture slit at the same speed as the speed of the intervalometer 40 across the viewing screen 30. Since the intervalometer 40 has been synchronized with the speed of object images on such viewing screen, there has been attained automatically a correlation between film speed and the speed of object images across the focal plane of the objective 11. Since the operator can see all ground object images within the field of view of the photographic lens and can see them both before and after they have crossed the narrow transverse photographic slit, he has ample time and opportunity to make desired changes in film speed before a desired objective is photographed, and if it is desired to have a given ground object centrally positioned on the final picture, the operator may change the course of the airplane somewhat so as to positively center the objective upon the film. The film 16 moves continuously and a long strip of film may be thus exposed so as to form a continuous, complete and accurate picture of the terrain over which the airplane is flying.

It will be noted that in manually adjusting the variable resistance 50, so as to cause the motor 23 to drive film 16 at the desired speed past the aperture slit, the observer has automatically varied the resistance 66 so as to modulate the light passing through the lens 11 on its way to the film, and thereby prevent underexposure or overexposure of such film.

In order to prevent the film 16 from being fogged by stray light entering the camera housing through the viewing screen 30, an additional light baffle 68 is provided between the aperture slit and the reflector 31. The reflector 31 acts as a baffle to some extent.

Since it is highly desirable to maintain the narrow aperture slit free from dust or foreign particles, an air inlet 70 is provided in the side of the camera housing 1, this air inlet being preferably provided with a filter. A suction hose coupling is indicated at 71 and is attached to the magazine housing 2. Air is therefore drawn into the camera housing through the filter inlet 70 and through the narrow aperture slit and is discharged from the magazine by the suction line attached to the outlet 71. This direction of air movement facilitates perfect contact of the film against the film moving roller 14.

It may be noted that the film roller 14 may be relatively heavy so as to act as a fly wheel and thereby absorb minor inequalities or changes in speed of the driving mechanism. In some instances such driving roller 14 may be hollow and provided with minute surface perforations communicating with the interior of the roller, the interior of the roller being also attached to a suction line whereby the film is caused to adhere to the surface of the roller without slippage. The diameter of the roller 14 should be sufficiently large so that the minute portion which is exposed to the aperture slit is substantially flat. The aperture slit may be on the order of 0.002 inch to 0.05 inch in width, but it is to be noted that material departures may be made from these exemplary widths.

In the form of camera described hereinabove it has been assumed that the elements 18 and 19 were stationary. In some instances it may be desirable to vary the width of the aperture slit and in order to facilitate such variation, an arrangement such as shown in Fig. 7 may be employed, whereby the slit defining portions now identified as 18' and 19' may be adjusted toward and away from each other as by means of a regulating screw 72 adapted to bear against the ends of the portions 18' and 19' so as to move the same longitudinally against the opposing pressure of a spring 73 acting gainst a bearing plate 74 in contact with the other end of the members 18' and 19'. Each of the last mentioned members may be provided with two or more inclined slots, having fixed pins extending therethrough, the slots 75 of one member being oppositely inclined to the slots 76 formed in the other member. It will be obvious that the opposing edges of the members 18' and 19' may in this manner be readily adjusted toward and away from each other.

Although most aerial maps are recorded upon emulsions carried by a transparent film, or carrier, and needs be developed and then printed, the present invention also contemplates an aerial camera adapted to produce direct prints on photo-sensitive paper, thus avoiding the additional step of photographic printing from a negative. The use of this direct positive developing process makes it desirable to introduce into the optical system of the camera a reflector adapted to reverse the image, transversely of the slit, before the light reaches the aperture slit. Such an arrangement is diagrammatically illustrated in Fig. 8 wherein the objective indicated at 11, is directed upon a narrow slit, photosensitive paper 80 passing transversely across such slit at the focal plane of the lens. An auxiliary reflector 81 is positioned in front of the objective 11 so as to properly reverse the image. The split reflector 31' casts its images upon the viewing screen 30. In the modification diagrammatically shown in Fig. 8, the camera extends horizontally, and the observer may watch the images directly in the viewing screen 30. It will be obvious to those skilled in the art, however, that the auxiliary reversing reflector may be positioned within the camera housing and between the objective and the photo-sensitive paper.

It may also be noted that in some instances variably adjustable neutral wedges may be positioned between the objective and the aperture slit for the purpose of modulating the light and thereby regulating exposure.

Numerous other modifications and changes may be made without departing from the spirit and scope of the present invention, and those skilled in the art will readily appreciate the numerous changes, modifications and variations to which the present invention may be subjected. The invention is not limited to the specific form described hereinabove, but instead embraces all changes and modifications coming within the scope of the following claims.

I claim:

1. A continuous motion, shutterless, aerial camera comprising: a camera housing, an objective lens at one end of said housing, a magazine removably carried by the other end of said housing; a narrow aperture slit in the focal plane of the lens in said housing and between said housing and magazine; means for moving strip film transversely past said slit and in the direction of flight; a viewing screen carried by the camera and adapted to depict moving images of ground objects within the field of view of the objective lens and to depict said images as they approach the aperture slit; an intervalometer adjacent said viewing screen and in operative relation thereto; and a single adjustable motor means for simultaneously driving the intervalometer and film moving means at the speed and in the direction of object images moving over said viewing screen and focal plane respectively.

2. In an aerial camera of the character described in claim 1, a supply reel and a take-up reel in said magazine; a slip drive connection between said adjustable motor means and said take-up reel; and a releasable clutch connecting said motor with said film moving means.

3. In a continuous motion, shutterless, aerial camera adapted for use on aircraft in flight, the combination of: a camera housing; an objective lens at one end of said housing; a magazine removably carried by the other end of said housing; a masking member provided with a narrow aperture slit in the focal plane of the objective lens, said slit having a length substantially equal to the exposure width of the film within said magazine; means within said magazine for moving strip film transversely past said slit in the focal plane of said lens and in the direction of flight; a reflector within the camera housing and between said lens and aperture slit, angularly positioned with respect to the optical axis of the lens and adapted to reflect a portion at least of the field of view of the lens onto a viewing screen; a viewing screen carried by the camera and adapted to receive and depict moving images of ground objects from said reflector and from within the field of view of the objective lens and to depict said images on said viewing screen as such images approach the aperture slit; an intervalometer traversing said viewing screen; adjustable motor means for driving the intervalometer; and means for simultaneously varying the intervalometer and film-moving means whereby the speed of the intervalometer and of the film may be syncronized with the speed and in the direction of movement of object images moving over said viewing screen and focal plane respectively.

4. In an aerial camera of the character described in claim 3, the further combination of: a supply reel and a take-up reel in said magazine; a slip drive connection between said adjustable motor means and said take-up reel; and a releasable clutch connecting said motor means with said film moving means.

5. In an aerial camera having a housing and an objective lens, the combination of: a masking member in the focal plane of the objective lens, said masking member being provided with a narrow aperture slit; means for moving strip film transversely past said slit in the focal plane of said lens; a reflector in the optical axis of the objective lens adapted to reflect a portion at least of the field of view of the lens onto a viewing screen; a viewing screen carried by the camera and adapted to receive and depict moving images of ground objects from said reflector; an intervalometer traversing said viewing screen; and adjustable motor means for simultaneously driving the intervalometer and film moving means at the speed and in the direction of object images moving over said viewing screen and focal plane respectively.

6. A camera of the character described in claim 5 characterized in that the aperture slit has a length substantially equal in length to the exposure width of the film, said aperture slit extending transversely of the direction of movement of ground object images.

7. A camera of the character described in claim 5 characterized in that the reflector comprises a pair of spaced reflector portions, the space between said reflector portions forming a slit parallel to the aperture slit in the focal plane.

8. A continuous motion, shutterless, aerial camera comprising: an objective lens; a masking member virtually in the focal plane of said lens, said masking member including portions defining a narrow aperture slit; means for moving strip film transversely past said slit; a viewing screen associated with the camera and adapted to depict moving images of ground objects within the field of view of the objective lens and to depict said images as they approach the aperture slit; an intervalometer adjacent said viewing screen and in operative relation thereto, said intervalometer comprising a rotatable, substantially transparent cylinder, said cylinder having an optically opaque helix on its surface and an axial reference portion, the axis of rotation of said intervalometer cylinder being substantially perpendicular to the axis of the narrow aperture slit whereby the movement of the opaque helix along the viewing screen may be correlated with the movement of ground object images thereon; and adjustable motor means for simultaneously driving the intervalometer and film moving means at the speed and in the direction of object images moving over said viewing screen and focal plane respectively.

9. In a camera of the character described in claim 1, said aperture slit having a length substantially equal to the exposure width of the film, and means for regulatably adjusting the width of the slit.

10. In a camera of the character described in claim 5, said aperture slit having a length substantially equal to the exposure width of the film, and means for regulatably adjusting the width of the slit.

11. In a camera of the character described in claim 5, said aperture slit having a length substantially equal to the exposure width of the film, said aperture slit extending transversely of the direction of movement of ground object images, and means for regulatably adjusting the width of the slit.

12. In a camera of the character described in claim 3, means for regulatably adjusting the width of the aperture slit.

13. In a continuous motion, shutterless, aerial camera adapted for use on aircraft, the combination of: a housing, an objective lens at one end of the housing, a narrow aperture slit at the other end of the housing and virtually in the focal plane of the lens, said slit extending transversely of the direction of flight of the camera and transversely of the direction of movement of strip film past said slit; means for regulatably adjusting the width of the slit; a viewing screen carried by the camera and adapted to depict moving images of ground objects within the field of view of the objective lens; and a stationary reflector angularly disposed with respect to the axis of the objective lens and comprising a pair of spaced reflector portions, the space between the reflector portions forming a slit parallel to the aperture slit, said reflector being associated with said viewing screen to depict upon the viewing screen moving images of ground objects within the field of view of the objective lens as such images approach the aperture slit.

RUSSELL R. VOUGHT.